US012177615B2

(12) United States Patent
Nesbit, Jr.

(10) Patent No.: US 12,177,615 B2
(45) Date of Patent: Dec. 24, 2024

(54) ACOUSTICAL SOUND REINFORCEMENT SYSTEM AND METHOD

(71) Applicant: NTEKA Active, LLC, Knoxville, TN (US)

(72) Inventor: Donald Carl Nesbit, Jr., Knoxville, TN (US)

(73) Assignee: NTEKA Active, LLC, Knoxville, TN (US)

(*) Notice: Subject to any disclaimer, the term of this patent is extended or adjusted under 35 U.S.C. 154(b) by 302 days.

(21) Appl. No.: 17/873,629

(22) Filed: Jul. 26, 2022

(65) Prior Publication Data

US 2024/0040289 A1 Feb. 1, 2024

(51) Int. Cl.

| | |
|---|---|
| ***H04R 1/02*** | (2006.01) |
| ***B63B 1/12*** | (2006.01) |
| ***H04R 1/40*** | (2006.01) |
| ***H04R 5/02*** | (2006.01) |

(52) U.S. Cl.

CPC ............. *H04R 1/025* (2013.01); *H04R 1/403* (2013.01); *H04R 5/02* (2013.01); *B63B 1/121* (2013.01); *H04R 2201/403* (2013.01); *H04R 2205/024* (2013.01); *H04R 2205/026* (2013.01); *H04R 2499/13* (2013.01)

(58) Field of Classification Search

CPC .......... H04R 1/025; H04R 1/403; H04R 5/02; H04R 2201/403; H04R 2205/026; H04R 2499/13; B63B 1/121; B63B 45/08

See application file for complete search history.

(56) References Cited

U.S. PATENT DOCUMENTS

| | | | | |
|---|---|---|---|---|
| 9,469,254 B1* | 10/2016 | White | .................... | H04R 1/026 |
| 2018/0317004 A1* | 11/2018 | Sheedy | .................... | B63B 19/02 |

* cited by examiner

*Primary Examiner* — Sunita Joshi

(74) *Attorney, Agent, or Firm* — Fresh IP PLC; John R. Bednarz

(57) ABSTRACT

A system includes at least one sound producing device comprising at least one speaker stacked vertically and configured to be housed in a corner of furniture of a pontoon watercraft and generating constructive interference gains in at least one zone at a particular sound stage at a height above a deck of the pontoon watercraft.

19 Claims, 15 Drawing Sheets

ACOUSTICAL SOUND REINFORCEMENT SYSTEM AND METHOD

FIELD

This application relates generally to an acoustical sound reinforcement system that may include at least one enclosure to be located in a corner of furniture in a marine or recreational vehicle (RV) having at least one sound device to generate at least one zone of sound based on constructive interference gains.

BACKGROUND

Conventional sound solutions for marine and recreational vehicles (RVs) typically add more speakers that are scattered throughout a listening area. However, this fails to achieve engineered sound, unobstructed sound sources, or provide any sort of design aesthetics. As an example, pontoon boats may locate speakers near ankles or place them in a back rest area in seating. These sorts of speaker placement issues continue to provide problems. As an example, speakers located near ankles may be obstructed by objects on the deck. Speakers located in a back rest area may be obstructed by occupants.

It is with these issues in mind, among others, that various aspects of the disclosure were conceived.

SUMMARY

According to one aspect, an acoustical sound reinforcement system and method is provided for selecting at least one location in a corner of furniture in one of a marine vehicle or a land vehicle, utilizing the corner and placing at least one sound device to be housed in the corner, and generating at least one zone of sound based on constructive interference gains using the at least one sound device that may be in the enclosure to be housed in the corner. As an example, the corner may be associated with furniture or a layout of a pontoon boat or another type of boat. The furniture may be rotomolded furniture or another type of furniture. In one example, there may be at least one first enclosure in a bow cockpit and/or at least one second enclosure in an aft cockpit that together may generate the at least one zone of sound based on the constructive interference gains.

In one example, a system may include at least one sound producing device comprising at least one speaker stacked vertically and configured to be housed in a corner of furniture of a pontoon watercraft and generating constructive interference gains in at least one zone at a particular sound stage at a height above a deck of the pontoon watercraft.

In one example, an enclosure may include a first side attached to a second side, and a third side having an array comprising at least one sound producing device attached to the first side and attached to the second side, the first side, the second side, and the third side configured to be housed in a corner of furniture of one of a watercraft and a recreational vehicle (RV), wherein the first side forms a first wall of the enclosure, the second side forms a second wall of the enclosure, and the first side, the second side, and the third side together forming a triangular prism.

In another example, a method may include selecting at least one location in at least one corner of furniture in one of a marine vehicle and a land vehicle, utilizing the corner and placing at least one sound device in an enclosure to be housed in the corner of furniture, and generating at least one zone of sound based on constructive interference gains using the at least one sound device in the enclosure to be housed in the corner of furniture.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
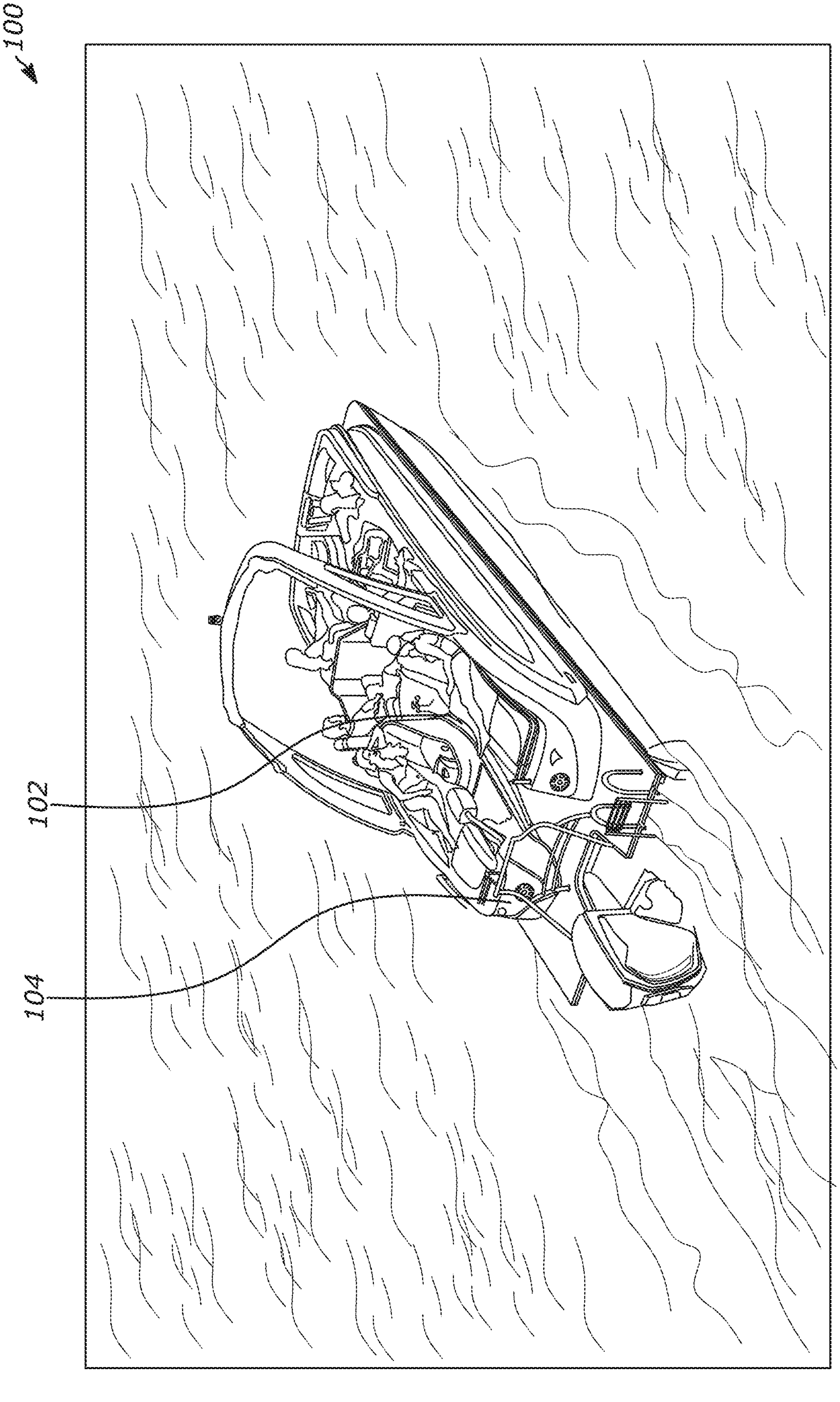
FIG. 1 is a side rear view of a pontoon boat according to an example of the instant disclosure.

The present disclosure is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present disclosure, as the disclosure encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Acoustic solutions for marine and recreational vehicles (RVs) have traditionally involved adding more speakers that are scattered throughout a listening area of the watercraft or vehicle. However, this does not provide engineered sound or design aesthetics. An acoustical sound reinforcement system is discussed herein that provides multiple levels of output while using one or more sound devices or speakers to allow watercraft or vehicles to provide premium sound systems without having to scatter speakers throughout the watercraft or vehicle and provide an engineered response. Conventional designs require holes to be cut and speakers to be installed in different locations without any acoustical engineering results that are repeatable with each installation. The system discussed herein is versatile and allows for concealment that is not currently provided, acoustical control that is engineered, and increased output by adding gain from the system. In addition, the system brings the sound stage up from a floor of the vehicle or watercraft or down from a ceiling to a listener's level, provides additional locations for acoustical gains without taking up more space or scattering speakers throughout the watercraft or vehicle, and delivers depth and richness of low-frequency improvement with less power allowing for battery gains.

The system may be designed in a way to allow the enclosure to be integrated or concealed into furniture while including one or more sound devices such as one or more speakers while using minimal space on a watercraft or a vehicle. As an example, the system may include a number of speakers as well as displacement plugs and there may be one or more enclosure systems located on a watercraft or vehicle such they can be located in furniture and seating arrangements. The one or more displacement plugs may be used to modify or change internal airspace associated with the system. The one or more speakers may be located in an array such that they can be a horizontal array or vertical array of speakers. The enclosure system may include acoustically tuned apertures, branding plates, and accessible installation options.

As an example, the system may be designed within rotomolded furniture, strategically placed, angled, secured, and allow for full expansion from a single speaker to multiple speakers. As an example, the furniture may be rotationally molded plastic furniture or plastic rotomolded furniture such as polyethylene construction furniture. Conventional systems simply mount speakers in many locations and label the system as premium. These conventional audio solutions are easiest and the norm. However, this traditional approach has been used since the 1990*s*. As watercraft and vehicles become more expensive, expectations continue to grow. Watercraft and recreational vehicles do not provide audio experiences to match that of automobiles. Rather, the system discussed herein allows for concealment, acoustical control, increased output, a raised sound stage, and additional mounting options for acoustical gains without taking up more space, thereby delivering depth and richness of low-frequency improvement with less power allowing for battery gains.

The system may be tuned for one or more speakers and/or one or more drivers to allow maximum output and volume across all frequencies as well as provide depth and richness to low-end frequencies. The system may house one or more speakers that may be arranged in an array that may be powered by one or more amplifiers. Manufacturers of watercraft and vehicles may include one or more enclosure systems to deliver acoustically engineered experiences that may be consistent, reliable, efficient, and concealed.

The system and method discussed herein provides an improved sound performance on watercraft such as pontoon boats by utilizing key areas for acoustical coverage while having constructive gains in sound performance, even distribution, concealment, installation improvements, better placement, maximized spacing, and ease of expansion.

Locations of audio devices on pontoon watercraft have conventionally been near ankles while in some cases, the audio devices are located in back rest areas in seating. However, these locations are flawed. The system and method utilize speaker placement with an acoustical advantage and prevent blockage by occupants and objects while providing better sound coverage, performance, and enjoyment. As a result, the enclosure system solves speaker placement issues that have plagued pontoon boats while improving installation for boat assembly lines to prevent wiring in multiple locations. This delivers sound closer to an ear level of occupants and maximizes low end improvements from traditional speakers.

The system solves issues of speaker placement onboard a watercraft while providing additional locations for expansion of audio systems without requiring new speaker locations. There are limited obstructions of sound from occupants or objects such as coolers, rafts, or inflatable objects while raising the speakers up from a floorboard area to assist with sound quality.

The corner location can be used for many approaches to provide better coverage without any occupant blockage while placing the sound closer to the ear level. The corner location provides numerous scenarios for using a single speaker or multiple speakers. The speakers can be positioned to provide coverage in more areas of the boat or recreational vehicle while also creating an area for constructive interference when speakers are aimed into specific listening areas to work together.

By incorporating the system into rotomold furniture directly or using an external add-on part when it cannot be incorporated into the rotomold furniture, this can utilize rounded corners in pontoon furniture that is typically dead space or not utilized. This provides superior positioning, audio coverage, installation, concealment, sound performance, limited obstruction, and multiple ways to install by being designed into the furniture or cut into the furniture as well as provides additional speaker locations for expansion. Additionally, the system could even house boat bumpers or other objects.

As one example, a system may include at least one sound producing device comprising at least one speaker stacked vertically and configured to be housed in a corner of furniture of a pontoon watercraft and generating constructive interference gains in at least one zone at a particular sound stage at a height above a deck of the pontoon watercraft. The at least one sound producing device may be located in a free-air or infinite baffle location on the pontoon watercraft. In another example, the at least one sound producing device may be located in an enclosure or cabinet to provide tuned or engineered results. In other words, the at least one sound producing device may be in free air and/or an enclosure.

As another example, an enclosure may include a first side attached to a second side, and a third side having an array comprising at least one sound producing device attached to the first side and attached to the second side, the first side, the second side, and the third side configured to be housed in a corner of furniture of one of a watercraft and a recreational vehicle (RV), wherein the first side forms a first wall of the enclosure, the second side forms a second wall of the enclosure, and the first side, the second side, and the third side together forming a triangular prism.

FIG. 1 is a side rear view of a pontoon boat 100 according to an example of the instant disclosure. As shown in FIG. 1, for the pontoon boat 100, there may be a front seating area including a left front seating area or bench, a right front seating area or bench, one or more captain's chairs in a center of the boat, and a rear seating area including a left rear seating area or bench and a right rear seating area or bench. FIG. 1 shows interior speakers 102 as well as transom speakers 104 of the boat. In particular, in this arrangement, the speakers are near the floor or deck of the boat using a lower seat base edge.

Figure 2:
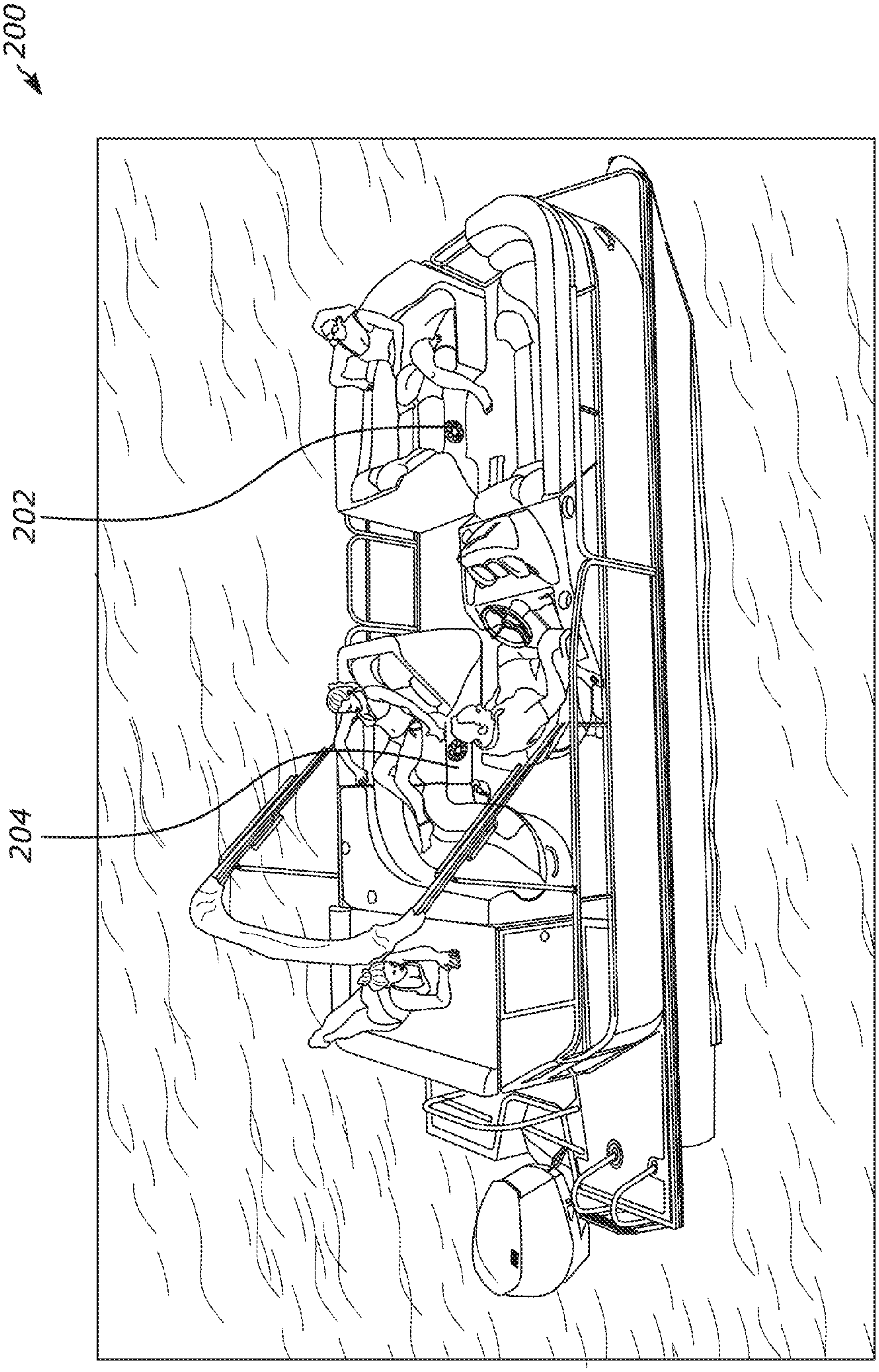
FIG. 2 is a side view of a pontoon boat according to an example of the instant disclosure.

FIG. 2 is a side view of a pontoon boat 200 according to an example of the instant disclosure. The pontoon boat 200 has a slightly different arrangement than the pontoon boat 100. In particular, there is a front seating area including a left front seating area or bench, a right front seating area or bench, a single captain's chair for the operator of the boat, and a first rear seating bench and an area for lounging on the rear of the boat. FIG. 2 shows speakers near the floor or deck of the boat using a lower seat base edge. In particular, FIG. 2 shows bow cockpit speakers 202 as well as aft cockpit speakers 204.

Figure 3:
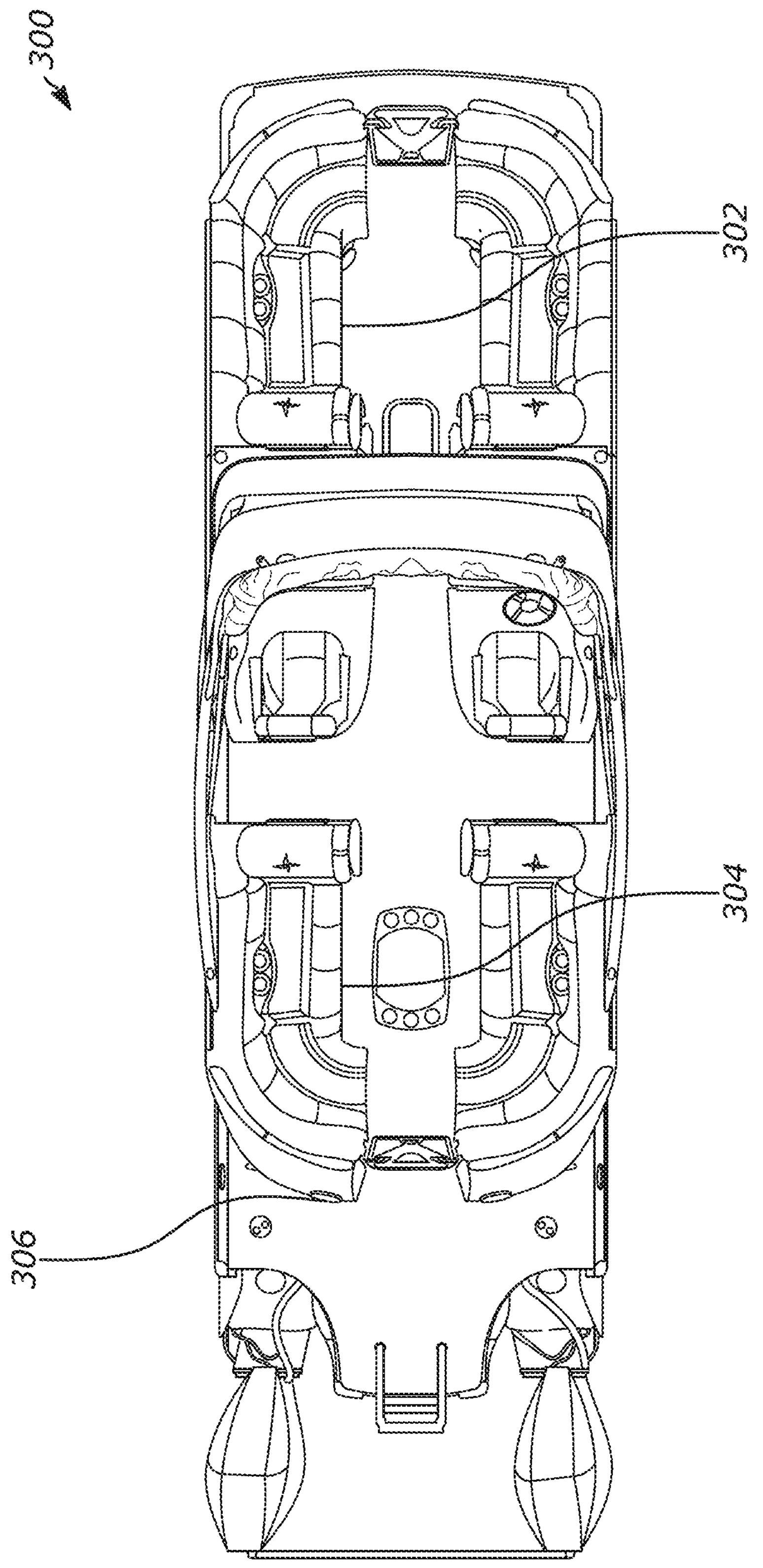
FIG. 3 is a top view of a pontoon boat according to an example of the instant disclosure.

FIG. 3 is a top view of a pontoon boat 300 according to an example of the instant disclosure. The top view of the pontoon boat 300 shows a front seating area including a left front seating area or bench, a right front seating area or bench, one or more captain's chairs in a center of the boat, and a rear seating area including a left rear seating area or bench and a right rear seating area or bench. FIG. 3 shows speakers near the floor or deck of the boat 300 using a lower seat base edge. In particular, FIG. 3 shows transom speakers 306, aft cockpit speakers 304, and bow cockpit speakers 302.

Figure 4:
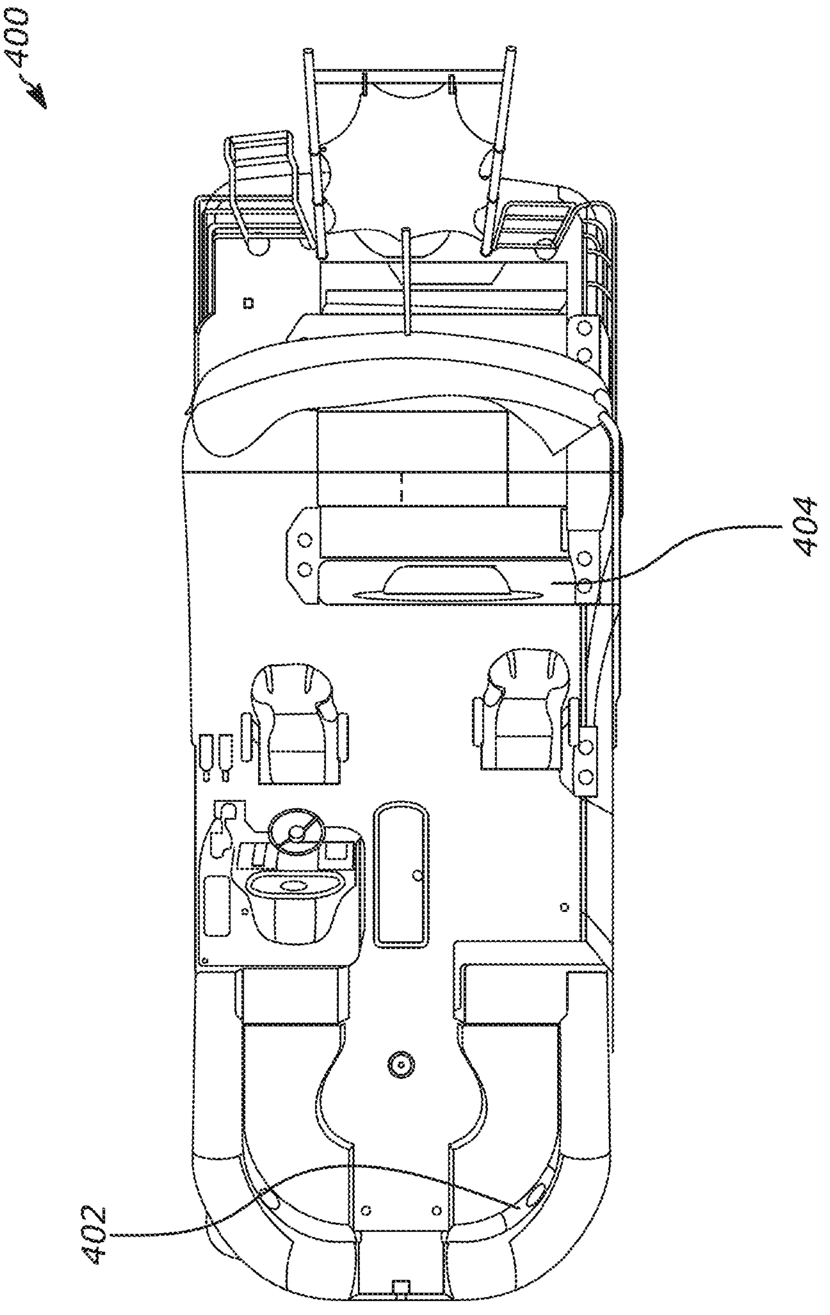
FIG. 4 is another top view of a pontoon boat according to an example of the instant disclosure.

FIG. 4 is another top view of a pontoon boat 400 according to an example of the instant disclosure. FIG. 4 shows that conventionally, speakers 402 may be placed in lounge seat back area. However, the speakers are blocked or obstructed by occupants when in use. In particular, FIG. 4 shows bow cockpit speakers in the seat 402 and aft cockpit speakers 404 that are near the floor or deck.

Figure 5:
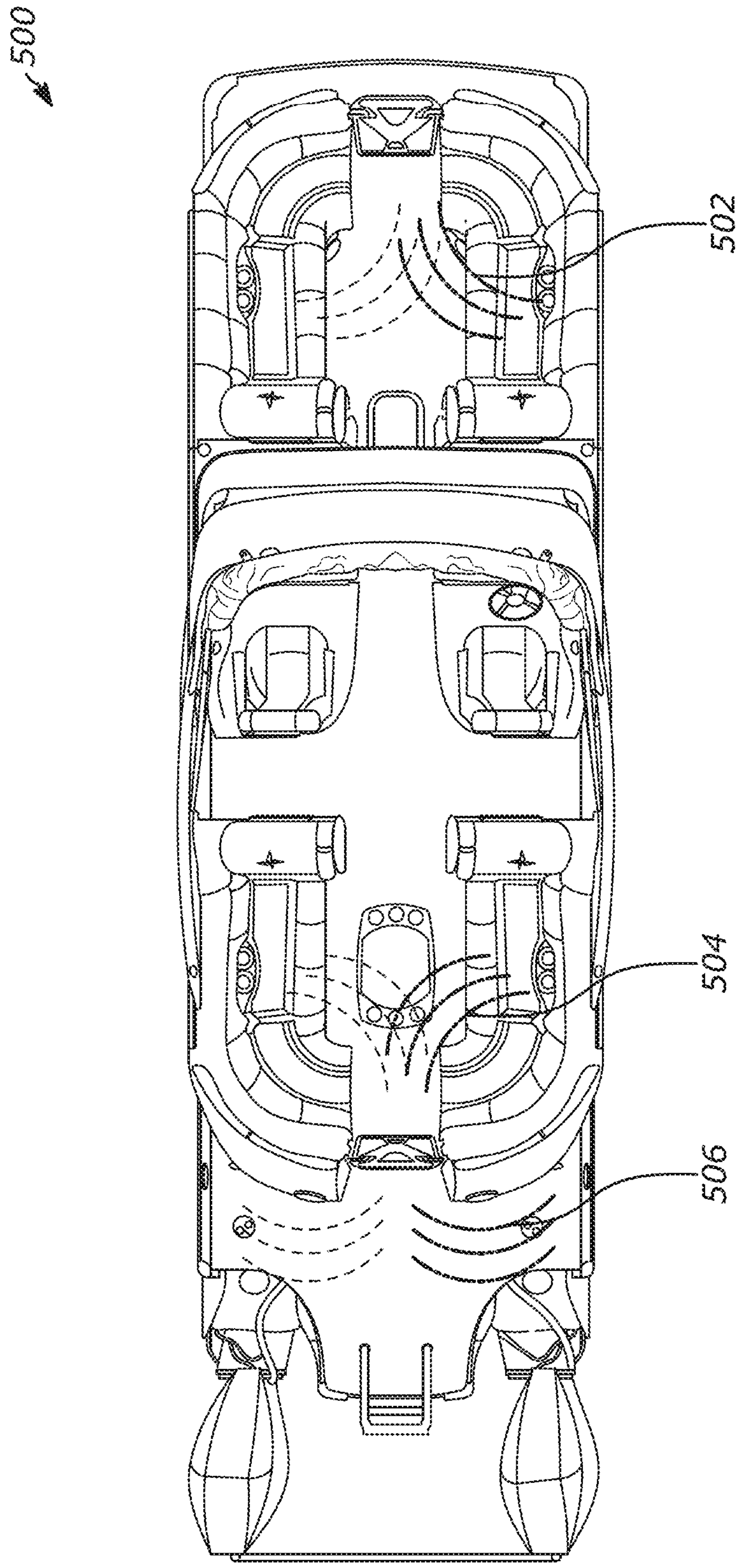
FIG. 5 is a top view of a pontoon boat showing traditional speaker placement according to an example of the instant disclosure.

FIG. 5 is a top view of a pontoon boat 500 showing traditional speaker placement according to an example of the instant disclosure. FIG. 5 shows an acoustical overview of traditional sound for the pontoon boat. In particular, there is a transom speaker sound zone 502 as well as an aft cockpit speaker sound zone 504 as well as a bow cockpit speaker sound zone 506.

Figure 6:
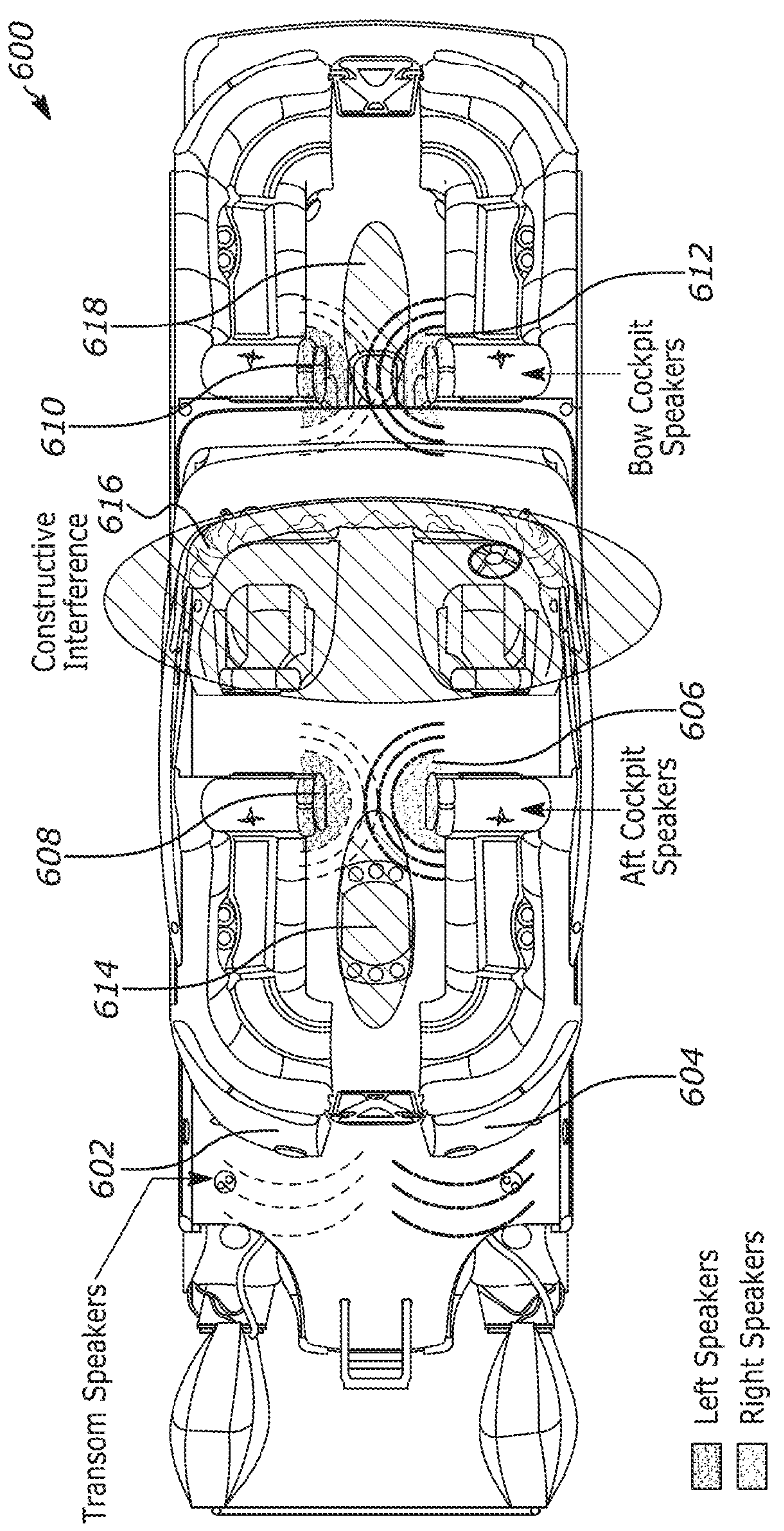
FIG. 6 is a view of an acoustical sound reinforcement system incorporated into a pontoon boat according to an example of the instant disclosure.

FIG. 6 is a view of an acoustical sound reinforcement system 600 incorporated into a pontoon boat according to an example of the instant disclosure. As shown in FIG. 6, there can be transom speakers 602 and 604 as well as aft cockpit speakers 606 and 608 as well as bow cockpit speakers 610 and 612. As shown in FIG. 6, the aft cockpit speakers 606 and the bow cockpit speakers 608 are arranged to be housed in corners of the furniture of the boat and provide constructive interference in a first zone 614, a second zone 616, and a third zone 618. As an example, each of the first zone 614, the second zone 616, and the third zone 618 may be associated with two or more sound waves that occupy a same point to create a phenomenon of super-positioning. An amplitude of each wave is added together and a resultant wave is obtained thereby creating constructive interference. Thus, amplitude may be at a maximum.

Figure 7:
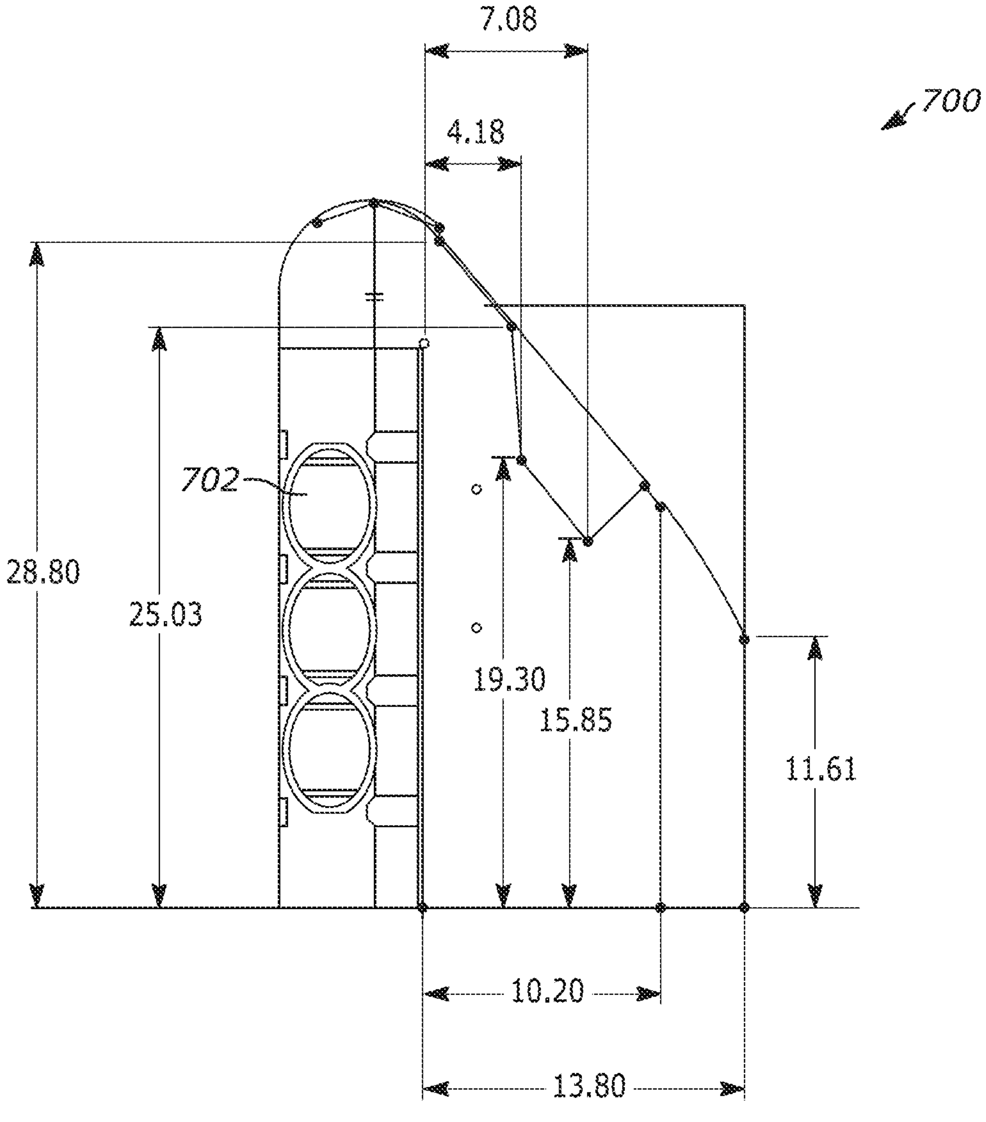
FIG. 7 is a different view of the acoustical sound reinforcement system according to an example of the instant disclosure.

FIG. 7 is a different view of the acoustical sound reinforcement system 700 according to an example of the instant disclosure. As shown in FIG. 7, the one or more sound devices 702 may be arranged vertically in an array and may be placed in a corner of furniture of the boat to provide a sound creating single driver or multiple drivers on a same plane. As shown in FIG. 7, the enclosure may have a particular set of dimensions such that it fits in the corner of the furniture. Example measurements are shown in FIG. 7.

Figure 8:
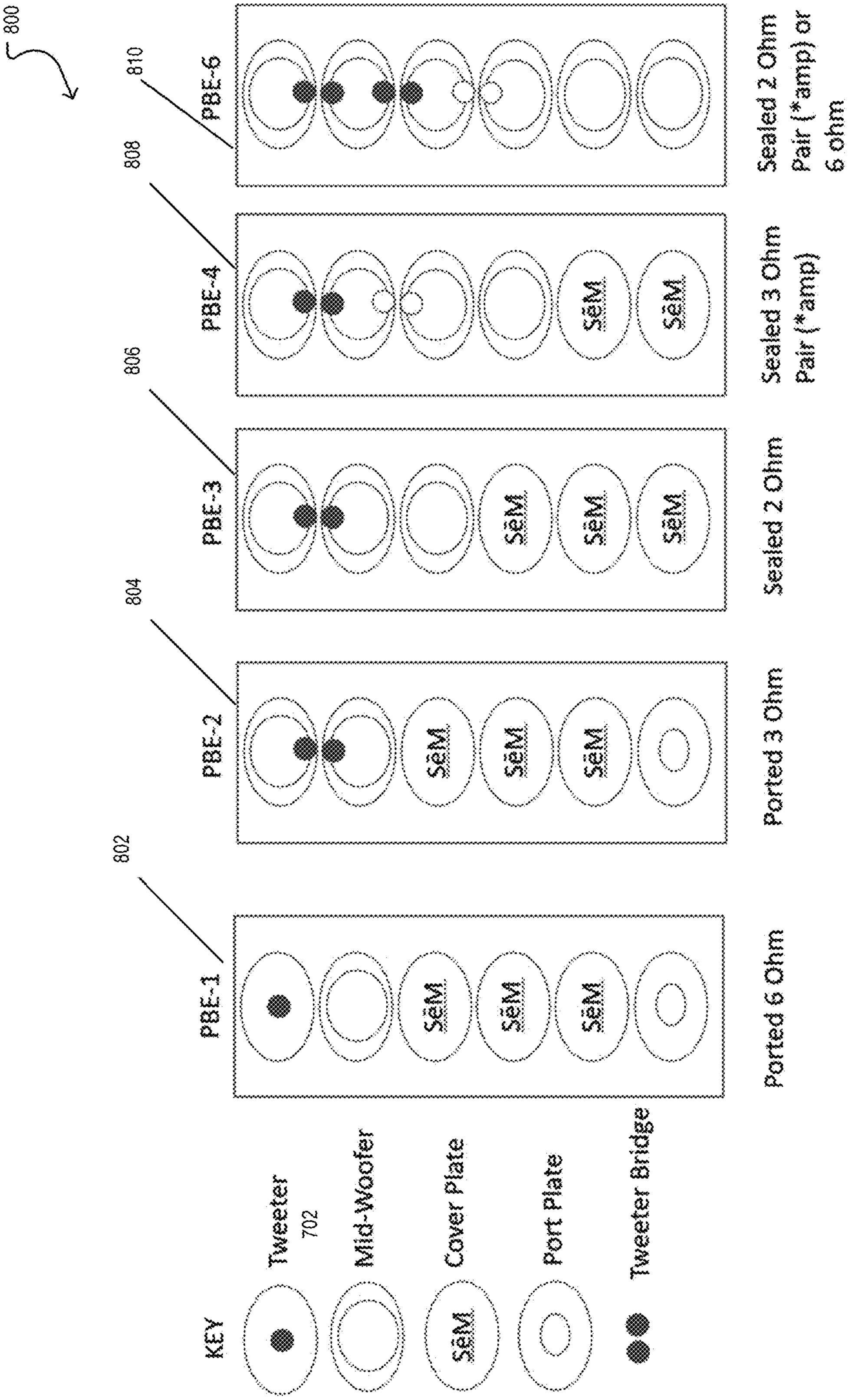
FIG. 8 illustrates different arrangements of a sound device array according to an example of the instant disclosure.

FIG. 8 illustrates different arrangements of a sound device array 800 according to an example of the instant disclosure. As shown in FIG. 8, there may be a first arrangement of the sound device array 802, a second arrangement of the sound device array 804, a third arrangement of the sound device array 806, a fourth arrangement of the sound device array 808, and a fifth arrangement of the sound device array 810, among others.

The first arrangement of the sound device array 802 allows for a single speaker to be placed in an ideal location (e.g., height, angle, size). This arrangement may be a ported six ohm arrangement. The second arrangement of the sound device array 804 allows for dual speakers to be placed in an ideal location and doubles a cone area. This arrangement may be a ported three ohm arrangement. The third arrangement of the sound device array 806 allows for three speakers to be wired in a way that may allow for the impedance to be matched to an amplifier without making changes to electronics. This may be a sealed two ohm arrangement. The fourth arrangement of the sound device array 808 may allow for a dual system or double an amount of power. This may be a sealed three ohm pair arrangement. The fifth arrangement of the sound device array 810 may allow for a maximum coverage of space or zones. This may be a sealed two ohm pair or six ohm arrangement. The location in a corner of furniture provides an ideal location acoustically, provides installation simplicity, expansion, more cone area, and improved sound performance by having speakers off of the floor or deck and out of back rest areas.

As an example, the first arrangement 802 may include a vertical array comprising a tweeter, a mid-woofer, a cover plate, a first cover plate, a second cover plate, and a port plate, the second arrangement 804 may include a mid-woofer, a tweeter bridge, a mid-woofer, a first cover plate, a second cover plate, a third cover plate, and a port plate, a third arrangement 806 may include a mid-woofer, a tweeter bridge, a mid-woofer, a mid-woofer, a first cover plate, a second cover plate, and a third cover plate, a fourth arrangement 808 may include a mid-woofer, a tweeter bridge, a mid-woofer, a tweeter bridge, a mid-woofer, a mid-woofer, a first cover plate, and a second cover plate, and a fifth arrangement 810 may include a mid-woofer, a tweeter bridge, a mid-woofer, a tweeter bridge, a mid-woofer, a tweeter bridge, a mid-woofer, and a mid-woofer.

Figure 9:
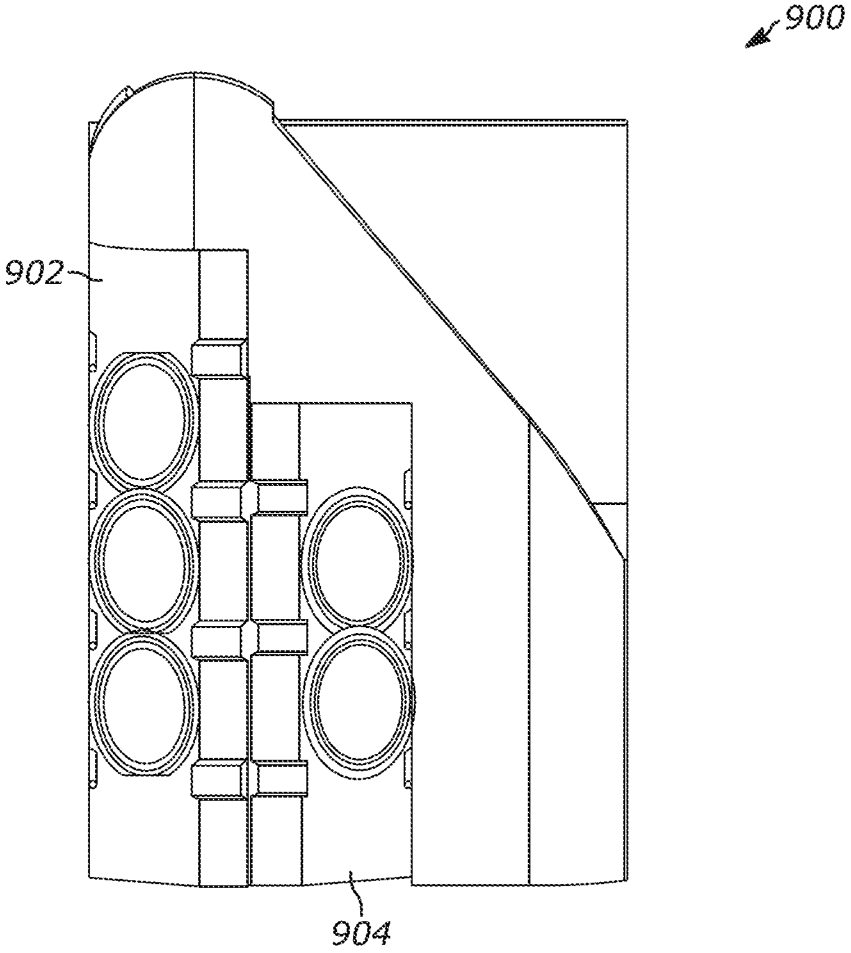
FIG. 9 illustrates another example of the acoustical sound reinforcement system according to an example of the instant disclosure.

FIG. 9 illustrates another example of the acoustical tuned sound reinforcement system 900 according to an example of the instant disclosure. As shown in FIG. 9, there may be a first sound device array 902 that is directed in a first direction and a second sound device array 904 that may be directed a second direction that is different than the first direction. In one example, the first direction and the second direction may be 90 degrees different from one another, among other options.

Figure 10:
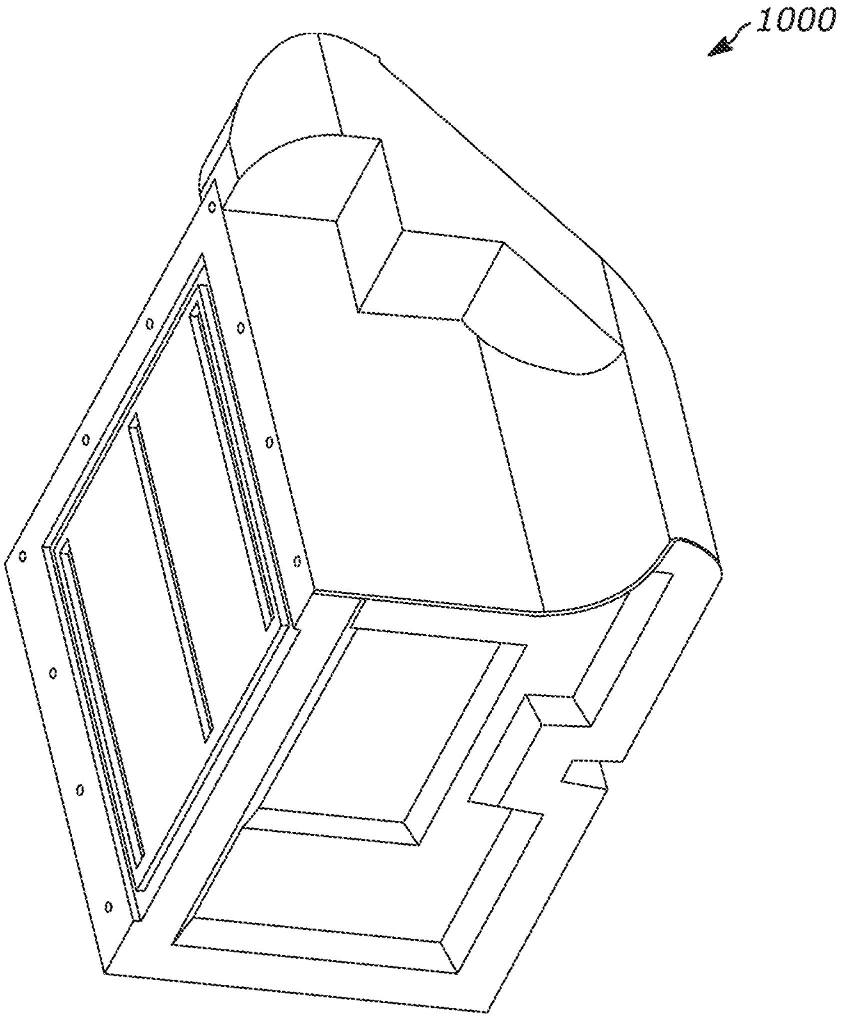
FIG. 10 shows the acoustical sound reinforcement system without the sound devices according to an example of the instant disclosure.

FIG. 10 shows the acoustical sound reinforcement system 1000 without the sound devices according to an example of the instant disclosure. As shown in FIG. 10, the system may be housed in a corner area to provide a full range of sound for single or multiple drivers as well as include a subwoofer that may be housed in the corner area.

Figure 11:
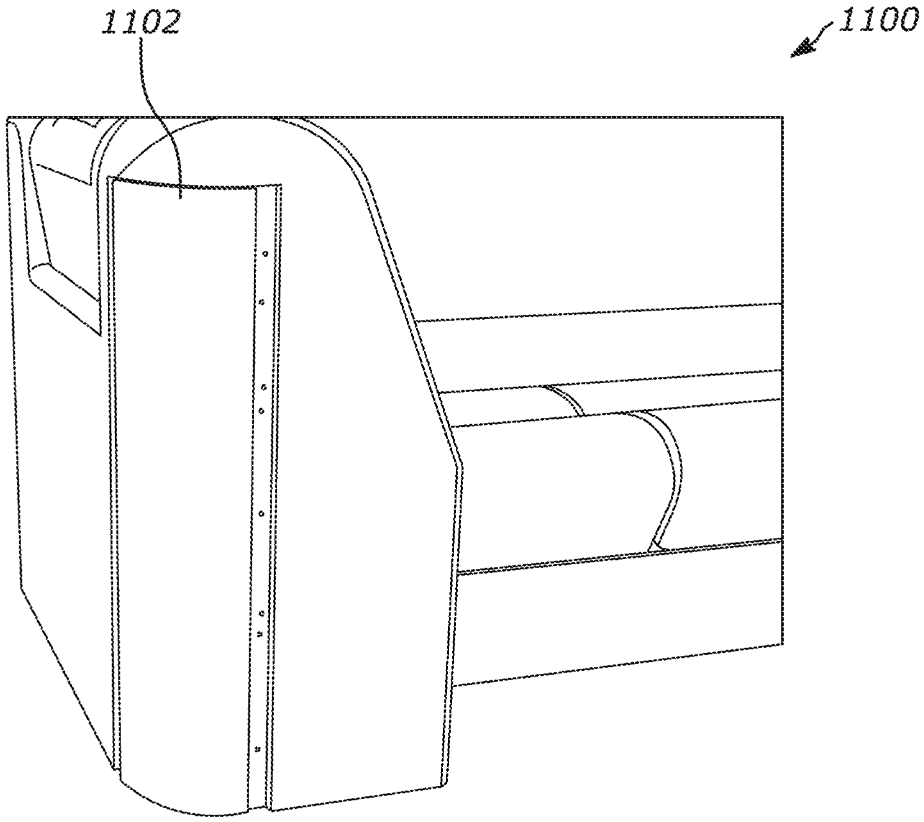
FIG. 11 illustrates the acoustical sound reinforcement system included as part of a seating section according to an example of the instant disclosure.

FIG. 11 illustrates the acoustical sound reinforcement system 1100 included as part of a seating section according to an example of the instant disclosure. As shown in FIG. 11, the corner area including the one or more sound devices may be concealed by paneling or can be exposed to provide a sporty appearance. FIG. 11 shows the concealed appearance 1102.

Figure 12:
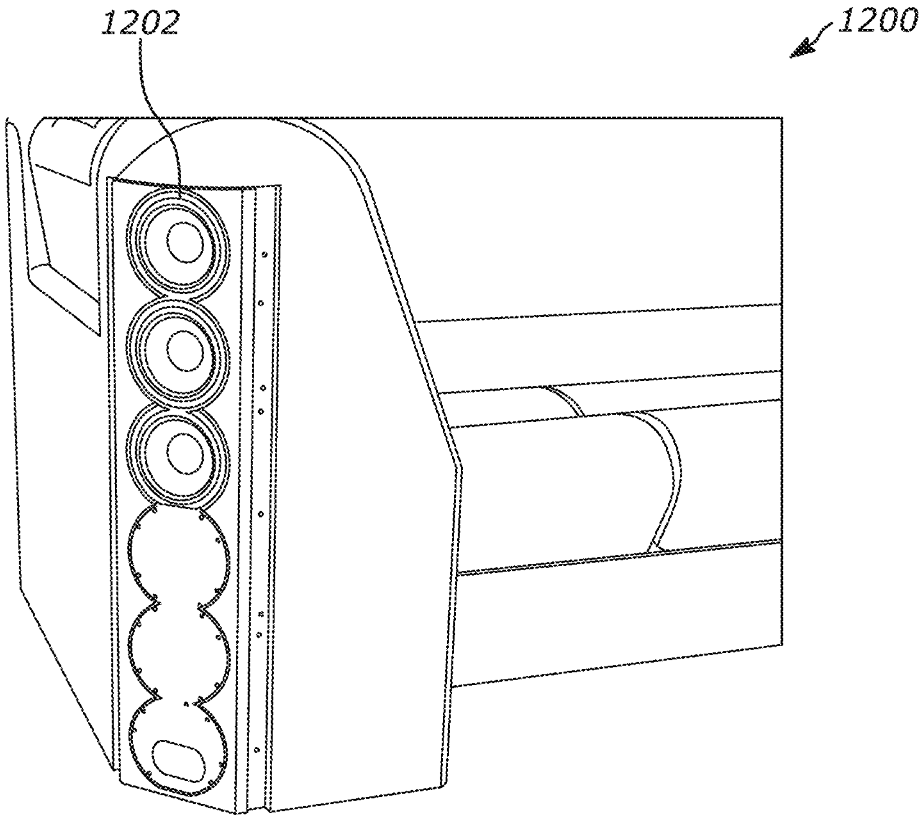
FIG. 12 illustrates another view of the acoustical sound reinforcement system included as part of the seating section according to an example of the instant disclosure.

FIG. 12 illustrates another view of the acoustical sound reinforcement system 1200 included as part of the seating section according to an example of the instant disclosure. As shown in FIG. 12, the corner area including the one or more sound devices may be concealed by paneling or can be exposed to provide a sporty appearance. FIG. 12 shows the sporty appearance including the apertures, openings, or holes for each of the one or more sound devices 1202.

Figure 13:
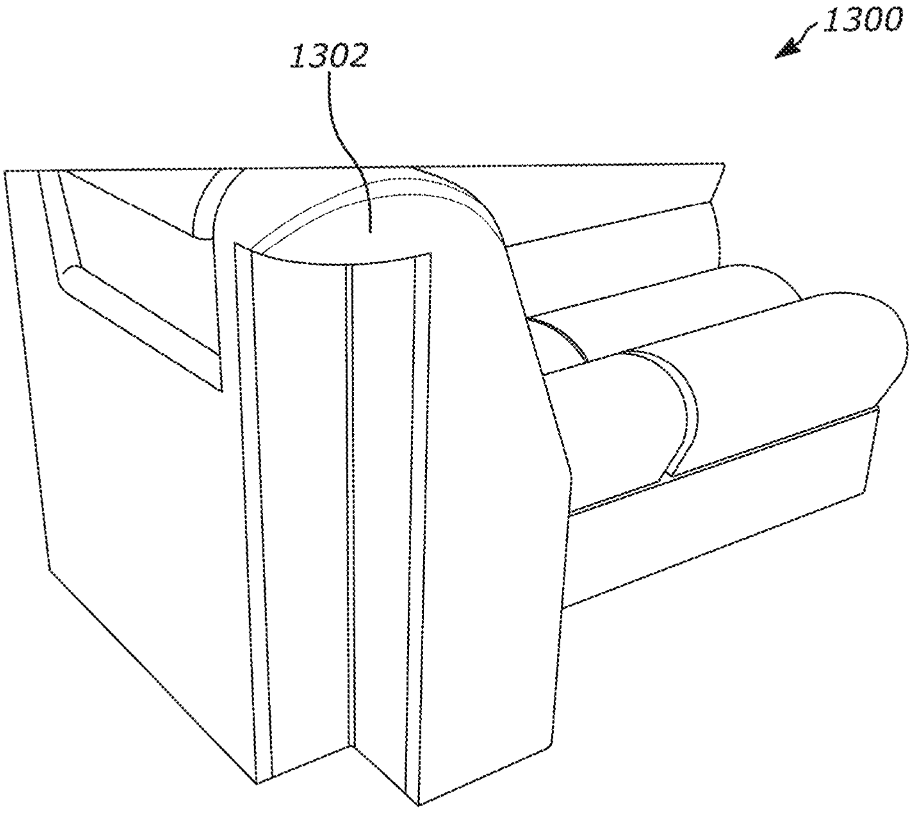
FIG. 13 illustrates the acoustical sound reinforcement system without the sound array according to an example of the instant disclosure.

FIG. 13 illustrates the acoustical sound reinforcement system 1300 without the sound array according to an example of the instant disclosure. As shown in FIG. 13, the system may be housed in a housing or enclosure in a corner of furniture of the boat or the recreational vehicle 1302. As noted above, the boat may be a pontoon watercraft. In particular, the corner of the furniture shows that it can receive the system including a first face or wall of the housing, a second face or wall of the housing, and a third face or wall of the housing may be exposed and provide the front facing wall for the one or more sound devices. As another example, the system 1300 may have a fourth face or wall.

Figure 14:
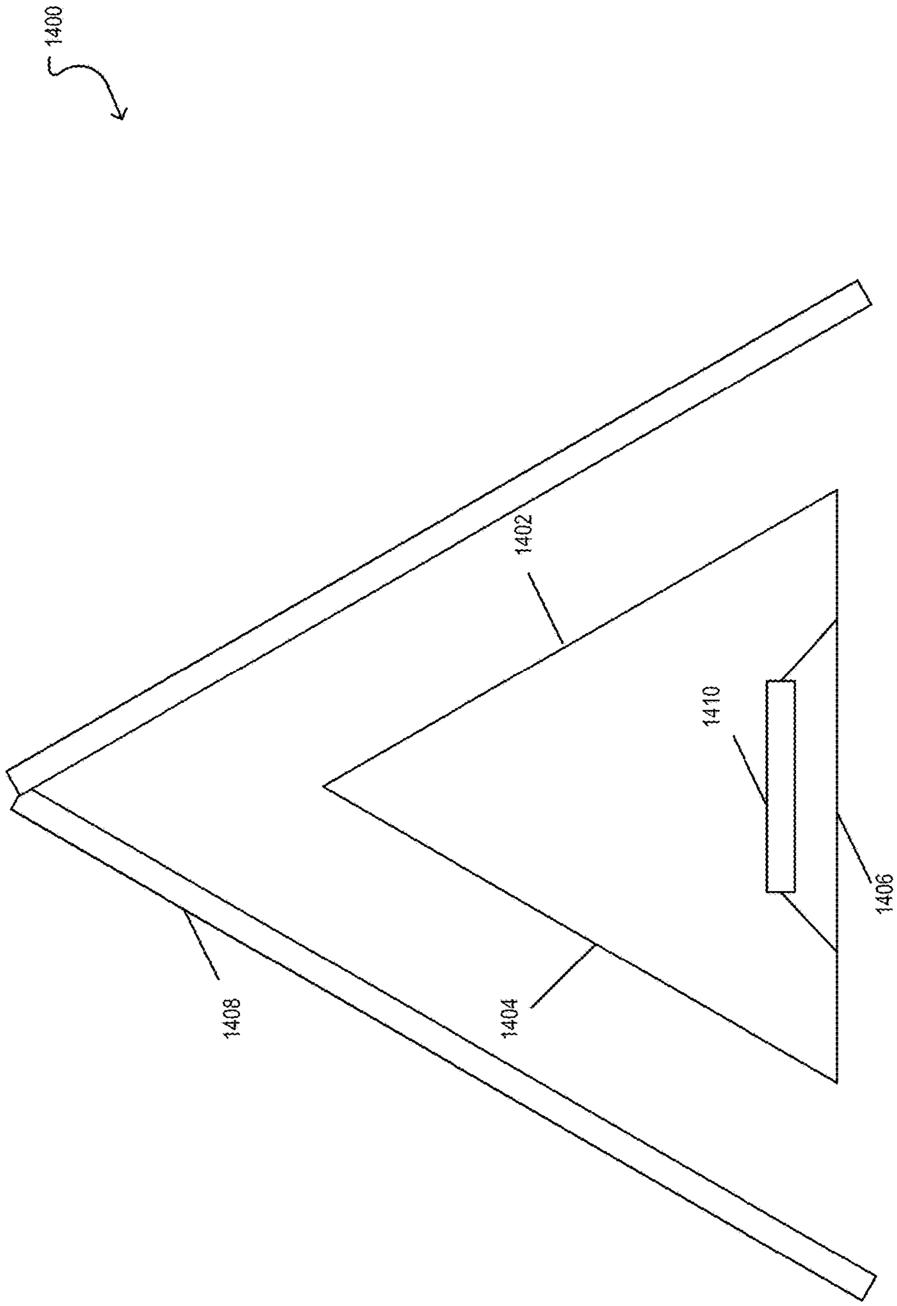
FIG. 14 illustrates a block diagram of an enclosure according to an example of the instant disclosure.

FIG. 14 illustrates a block diagram of an enclosure 1400 according to an example of the instant disclosure. As shown in FIG. 14, the enclosure 1400 may have a first side 1402, wall, or face, a second side 1404, wall, or face, and a third side 1406, wall or face. The first side 1402 and the second side 1404 may fit into the corner of furniture and the third side 1406 may be exposed and include the one or more sound devices. As an example, the third side 1406 may have paneling to protect or cover the one or more sound devices. The enclosure 1400 may fit within a rotomolded and integrated corner of the furniture 1408. The third side 1406 may house the array of the at least one sound producing device 1410. As another example, the system 1400 may have a fourth side.

Figure 15:
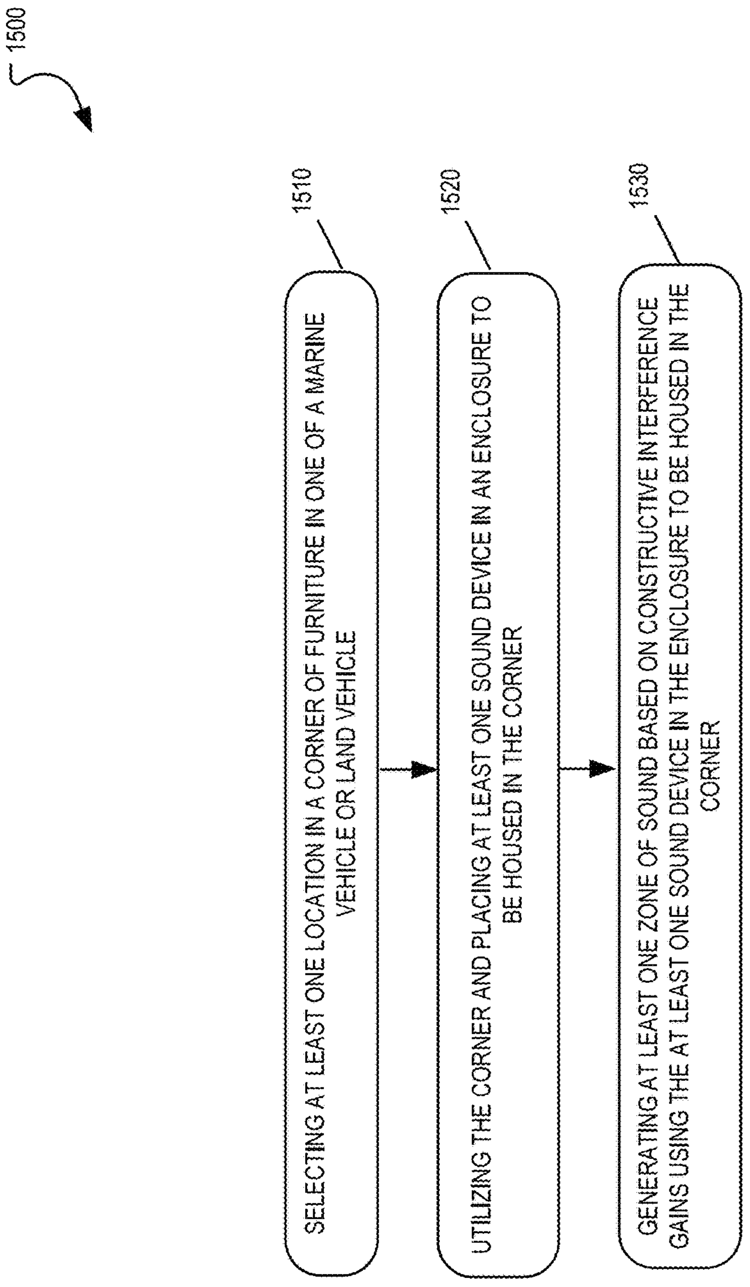
FIG. 15 is a flowchart of a method for generating at least one zone of sound based on constructive interference gains according to an example of the instant disclosure.

FIG. 15 illustrates an example method 1500 for generating at least one zone of sound based on constructive interference gains according to an example of the instant disclosure. Although the example method 1500 depicts a particular sequence of operations, the sequence may be altered without departing from the scope of the present disclosure. For example, some of the operations depicted may be performed in parallel or in a different sequence that does not materially affect the function of the method 1500. In other examples, different components of an example device or system that implements the method 1500 may perform functions at substantially the same time or in a specific sequence.

According to some examples, the method 1500 includes selecting at least one location in a corner of furniture of one of a marine vehicle or land vehicle at block 1510.

According to some examples, the method 1500 includes utilizing the corner and placing at least one sound device in the corner, optionally in an enclosure to be housed in the corner at block 1520.

In one example, a corner may be selected on a pontoon watercraft. The corner may be used to house at least one sound producing device comprising at least one speaker stacked vertically that generates constructive interference gains in at least one zone at a particular sound stage at a height above a deck of the pontoon watercraft.

As an example, the enclosure 1400 may have a size and dimensions as shown in FIG. 7, or another size. As an example, the enclosure 1400 may have a first side 1402 attached to a second side 1404 and can have a third side 1406 having an array comprising at least one sound producing device attached to the first side and attached to the second side, the first side, the second side, and the third side configured to be housed in a corner of furniture of one of a watercraft and a recreational vehicle (RV), wherein the first side forms a first wall of the enclosure, the second side forms a second wall of the enclosure, and the first side, the second side, and the third side together forming a triangular prism. As another example, the enclosure may have a fourth side and the first side, second side, third side, and fourth side may form a cube-type shape, or another type of shape.

As an example, the at least one sound producing device may include at least one tweeter and at least one mid-woofer. As an example, the furniture may be one of a lounge, a bench, a seat, a chair, and a swingback. The enclosure 1400 can be rotationally molded into the furniture and can have a width of X, a length of Y, and a height of Z, X, Y, and Z may be values that allow the enclosure to be molded and fit into the furniture. The enclosure 1400 is housed in a corner of a seating bench in one of a front and a rear of the watercraft. The at least one sound producing device may have at least one speaker stacked vertically and be housed within the triangular prism. In another example, the at least one sound producing device includes at least one tweeter and at least one mid-woofer stacked vertically and housed within the triangular prism. The enclosure may further include a tweeter bridge.

According to some examples, the method 1500 includes generating at least one zone of sound based on constructive interference gains using the at least one sound device in the enclosure to be housed in the corner at block 1530.

In one example, the enclosure 1400 is housed in a corner of a bow cockpit. In another example, the enclosure 1400 is housed in a corner of an aft cockpit. In another example, the enclosure 1400 may have a panel to conceal the at least one sound producing device. In one example, the enclosure 1400 may have at least one opening in the third side 1406, each of the at least one opening to receive the at least one sound producing device. In another example, the enclosure 1400 may have a second array of at least one sound producing device, the first array may be directed in a first direction and the second array of the at least one sound producing device may be directed in a second direction different than the first direction. As an example, the first side and the second side can be connected to one another and perpendicular to one another. In another example, the enclosure 1400 may have at least one displacement plug. As an example, the at least one sound producing device can deliver sound at a particular sound stage above a floor level of one of the watercraft and the recreational vehicle. The particular sound stage may be based on the furniture that may provide a location of the at least one sound producing device and result in the sound stage height.

In some cases, the at least one sound producing device is concealed in the furniture of one of the watercraft and the recreational vehicle. In addition, in one example, the at least one sound producing device has one of a first arrangement including a vertical array including a tweeter, a mid-woofer, a first cover plate, a second cover plate, a third cover plate, and a port plate, a second arrangement comprising a mid-woofer, a tweeter bridge, a mid-woofer, a first cover plate, a second cover plate, a third cover plate, and a port plate, a third arrangement comprising a mid-woofer, a tweeter bridge, a mid-woofer, a mid-woofer, a first cover plate, a second cover plate, and a third cover plate, a fourth arrangement comprising a mid-woofer, a tweeter bridge, a mid-woofer, a tweeter bridge, a mid-woofer, a mid-woofer, a first cover plate, and a second cover plate, and a fifth arrangement comprising a mid-woofer, a tweeter bridge, a mid-woofer, a tweeter bridge, a mid-woofer, a tweeter bridge, a mid-woofer, and a mid-woofer.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

Illustrative examples of the disclosure include:

Aspect 1: A system comprising at least one sound producing device comprising at least one speaker stacked vertically and configured to be housed in a corner of furniture of a pontoon watercraft and generating constructive interference gains in at least one zone at a particular sound stage at a height above a deck of the pontoon watercraft.

Aspect 2: An enclosure comprising: a first side attached to a second side, and a third side having an array comprising at least one sound producing device attached to the first side and attached to the second side, the first side, the second side, and the third side configured to be housed in a corner of furniture of one of a watercraft and a recreational vehicle (RV), wherein the first side forms a first wall of the enclosure, the second side forms a second wall of the enclosure, and the first side, the second side, and the third side together forming a triangular prism.

Aspect 3: The enclosure of Aspect 2, wherein the at least one sound producing device comprises at least one tweeter and at least one mid-woofer.

Aspect 4: The enclosure of Aspects 2 and 3, wherein the furniture comprises one of a lounge, a bench, a seat, a chair, and a swingback.

Aspect 5: The enclosure of Aspects 2 to 4, wherein the enclosure is rotationally molded into the furniture Aspect 6: The enclosure of Aspects 2 to 5, wherein the enclosure is housed in a corner of a seating bench in one of a front and a rear of the watercraft.

Aspect 7: The enclosure of Aspects 2 to 6, wherein the at least one sound producing device comprises at least one speaker stacked vertically and housed within the triangular prism.

Aspect 8: The enclosure of Aspects 2 to 7, wherein the at least one sound producing device comprises at least one tweeter and at least one mid-woofer stacked vertically and housed within the triangular prism.

Aspect 9: The enclosure of Aspects 2 to 8, further comprising a tweeter bridge.

Aspect 10: The enclosure of Aspects 2 to 9, wherein the enclosure is housed in a corner of a bow cockpit.

Aspect 11: The enclosure of Aspects 2 to 10, wherein the enclosure is housed in a corner of an aft cockpit.

Aspect 12: The enclosure of Aspects 2 to 11, wherein the at least one sound producing device generates constructive interference gains.

Aspect 13: The enclosure of Aspects 2 to 12, further comprising a panel to conceal the at least one sound producing device.

Aspect 14: The enclosure of Aspects 2 to 13, further comprising at least one opening in the third side, each of the at least one opening to receive the at least one sound producing device.

Aspect 15: The enclosure of Aspects 2 to 14, further comprising a second array of at least one sound producing device, the first array directed in a first direction and the second array of the at least one sound producing device directed in a second direction different than the first direction.

Aspect 16: The enclosure of Aspects 2 to 15, wherein the first side and the second side are connected to one another and perpendicular to one another.

Aspect 17: The enclosure of Aspects 2 to 16, further comprising at least one displacement plug.

Aspect 18: The enclosure of Aspects 2 to 17, wherein the at least one sound producing device delivers sound at a particular sound stage above a floor level of one of the watercraft and the recreational vehicle.

Aspect 19: The enclosure of Aspects 2 to 18, wherein the at least one sound producing device is concealed in the furniture of one of the watercraft and the recreational vehicle.

Aspect 20: The enclosure of Aspects 2 to 19, wherein the at least one sound producing device has one of a first arrangement comprising vertical array comprising a tweeter, a mid-woofer, a first cover plate, a second cover plate, a third cover plate, and a port plate, a second arrangement comprising a mid-woofer, a tweeter bridge, a mid-woofer, a first cover plate, a second cover plate, a third cover plate, and a port plate, a third arrangement comprising a mid-woofer, a tweeter bridge, a mid-woofer, a mid-woofer, a first cover plate, a second cover plate, and a third cover plate, a fourth arrangement comprising a mid-woofer, a tweeter bridge, a mid-woofer, a tweeter bridge, a mid-woofer, a mid-woofer, a first cover plate, and a second cover plate, and a fifth arrangement comprising a mid-woofer, a tweeter bridge, a mid-woofer, a tweeter bridge, a mid-woofer, a tweeter bridge, a mid-woofer, and a mid-woofer.

Aspect 21: A method comprising selecting at least one location in at least one corner of furniture in one of a marine vehicle and a land vehicle, utilizing the corner and placing at least one sound device in an enclosure to be housed in the corner of furniture, and generating at least one zone of sound based on constructive interference gains using the at least one sound device in the enclosure to be housed in the corner of furniture.

Aspect 22: The method of Aspect 21, wherein the at least one corner of furniture comprises a first corner of a bow cockpit of the marine vehicle and a second corner of the bow cockpit of the marine vehicle.

Aspect 23: The method of Aspects 21 and 22, wherein the at least one corner of furniture comprises a first corner of an aft cockpit of the marine vehicle and a second corner of the aft cockpit of the marine vehicle.

What is claimed is:

1. An enclosure comprising:

a first side attached to a second side; and a third side having an array comprising at least one sound producing device attached to the first side and attached to the second side, the first side, the second side, and the third side configured to be housed in a corner of furniture of one of a watercraft and a recreational vehicle (RV), wherein the first side forms a first wall of the enclosure, the second side forms a second wall of the enclosure, and the first side, the second side, and the third side together forming a triangular prism.

2. The enclosure of claim 1, wherein the at least one sound producing device comprises at least one tweeter and at least one mid-woofer.

3. The enclosure of claim 1, wherein the furniture comprises one of a lounge, a bench, a seat, a chair, and a swingback.

4. The enclosure of claim 3, wherein the enclosure is rotationally molded into the furniture.

5. The enclosure of claim 1, wherein the enclosure is housed in a corner of a seating bench in one of a front and a rear of the watercraft.

6. The enclosure of claim 1, wherein the at least one sound producing device comprises at least one speaker stacked vertically and housed within the triangular prism.

7. The enclosure of claim 1, wherein the at least one sound producing device comprises at least one tweeter and at least one mid-woofer stacked vertically and housed within the triangular prism.

8. The enclosure of claim 7, further comprising a tweeter bridge.

9. The enclosure of claim 1, wherein the enclosure is housed in a corner of a bow cockpit.

10. The enclosure of claim 1, wherein the enclosure is housed in a corner of an aft cockpit.

11. The enclosure of claim 1, wherein the at least one sound producing device generates constructive interference gains.

12. The enclosure of claim 1, further comprising a panel to conceal the at least one sound producing device.

13. The enclosure of claim 1, further comprising at least one opening in the third side, each of the at least one opening to receive the at least one sound producing device.

14. The enclosure of claim 1, further comprising a second array of at least one sound producing device, the first array directed in a first direction and the second array of the at least one sound producing device directed in a second direction different than the first direction.

15. The enclosure of claim 1, wherein the first side and the second side are connected to one another and perpendicular to one another.

16. The enclosure of claim 1, further comprising at least one displacement plug.

17. The enclosure of claim 1, wherein the at least one sound producing device delivers sound at a particular sound stage above a floor level of one of the watercraft and the recreational vehicle.

18. The enclosure of claim 1, wherein the at least one sound producing device is concealed in the furniture of one of the watercraft and the recreational vehicle.

19. The enclosure of claim 1, wherein the at least one sound producing device has one of:

a first arrangement comprising a vertical array comprising a tweeter, a mid-woofer, a first cover plate, a second cover plate, a third cover plate, and a port plate;

a second arrangement comprising a mid-woofer, a tweeter bridge, a mid-woofer, a first cover plate, a second cover plate, a third cover plate, and a port plate;

a third arrangement comprising a mid-woofer, a tweeter bridge, a mid-woofer, a mid-woofer, a first cover plate, a second cover plate, and a third cover plate, a fourth arrangement comprising a mid-woofer, a tweeter bridge, a mid-woofer, a tweeter bridge, a mid-woofer, a mid-woofer, a first cover plate, and a second cover plate; and a fifth arrangement comprising a mid-woofer, a tweeter bridge, a mid-woofer, a tweeter bridge, a mid-woofer, a tweeter bridge, a mid-woofer, and a mid-woofer.

* * * * *